May 13, 1958  W. H. G. FEARN  2,834,153
FLOWERPOT CONE
Filed March 13, 1956

INVENTOR.
William H. G. Fearn
BY Victor J. Evans & Co.
ATTORNEYS

United States Patent Office 2,834,153
Patented May 13, 1958

2,834,153

FLOWERPOT CONE

William H. G. Fearn, Oswego, N. Y.

Application March 13, 1956, Serial No. 571,261

2 Claims. (Cl. 47—34)

This invention relates to horticulture and particularly devices used over openings in lower ends of flowerpots, such as pots made of clay and the like, and in particular a cone formed of basketweave having a rim on the lower edge and having nodes projecting from the lower surface of the rim whereby with the device positioned in the lower end of a flowerpot the lower surface of the rim of the device is spaced above the bottom of the pot and an air space is provided above the conventional opening of the pot whereby it is possible for air to seep through soil in the pot and penetrate the root area around the stem or bulb of a plant.

The purpose of this invention is to provide means whereby the opening in the bottom of a conventional flowerpot is not closed by soil or litter such as is normally placed over the opening so that an open area is provided above the opening continuously.

The conventional clay flowerpot is provided with an opening in the bottom through which ventilation is obtained and with the root area in a flowerpot penetrated by air seeping through the opening in the bottom of the pot the roots are free to grow and a plant from which the roots extend has a healthy normal growth. However, in order to prevent soil dropping through the opening in the bottom of a flowerpot litter, such as pieces of broken flowerpots are placed over the opening, and in numerous instances the opening is sealed by such devices. With this thought in mind this invention contemplates a rigid upwardly extended device adapted to be positioned in the bottom of a flowerpot and over the opening through the bottom whereby an open air space is definitely provided in the lower part of a flowerpot and above the opening through the bottom thereof.

The object of this invention is, therefore, to provide a conical-shaped device that is adapted to be positioned on the bottom of a flowerpot whereby an open area within the device is continuously in communication with the atmosphere through an opening in the bottom of the flowerpot.

Another object of the invention is to provide a device adapted to be positioned in a flowerpot for providing an open air space above the opening through the bottom of the flowerpot in which the peripheral area of the device is slightly less than that of the flowerpot so that it is impossible for the device to be accidently moved to a position at one side of the opening through the bottom of the flowerpot.

A further object of the invention is to provide a conical-shaped spacing element adapted to be positioned upon the inner surface of the bottom of a flowerpot to provide an open air space in communication with the opening through the bottom of a conventional flowerpot in which the device is of a simple and economical construction.

With these and other objects and advantages in view the invention embodies a cone having a perforated wall, the wall being preferably formed of basketweave and having a continuous peripheral rim on the lower edge and spacing elements extended from the lower surface of the rim.

Othr features and advantages of the invention will appear from the following description taken in connection with the drawing, wherein.

Figure 1:
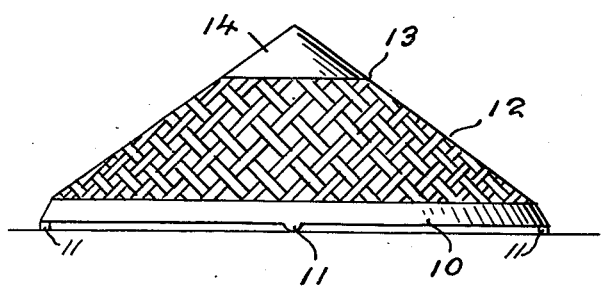
Figure 1 is a side elevational view of the improved flowerpot cone.

Referring now to the drawing wherein like reference characters denote corresponding parts the improved flowerpot holder of this invention includes a rim 10 providing a base and having nodes 11 extended from the under surface and a conical-shaped wall 12 of interwoven strips, such as basketweave extended from the upper edge of the rim 10 to a point 13 from which a cone 14 extends. The rim 10, intermediate portion 12 and tip 14 may be made of metal, plastic, or other suitable material and with the parts comparatively open the interior is readily cleaned and the device may be sterilized. By this means a device is provided that is adapted to be used repeatedly as upon removing plants from the flowerpot the cone is removed with the soil and after cleaning and sterilizing the cone is adapted to be placed in another flowerpot and reused.

Figure 4:
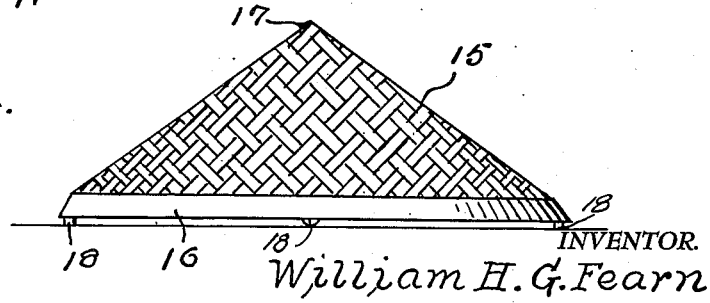
Figure 4 is a side elevational view similar to that shown in Fig. 1, showing a modification wherein the basketweave extends continuously to the apex of the cone.

In the design illustrated in Fig. 4 a cone is shown in which the lattice or basketweave 15 extends from the upper edge of the base or rim 16 to the apex 17 wherein a continuous perforated or porous web is provided from the base to the apex. In this design the lower edge of the base is also provided with nodes 18 similar to the nodes 11.

Figure 3:
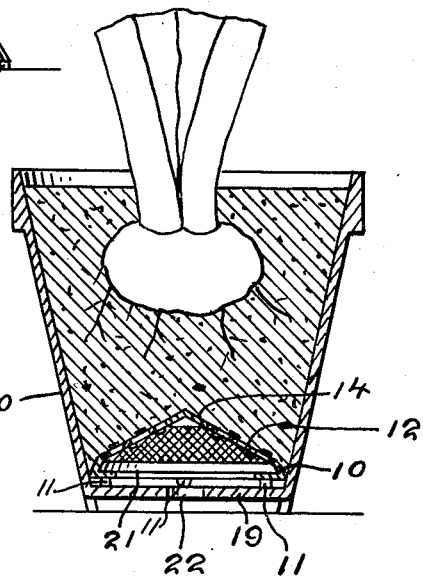
Figure 3 is an assembly view illustrating the use of the cone and showing in particular a vertical section through a flowerpot with the cone of this invention mounted upon the bottom and positioned in the lower end thereof.
Figure 2:
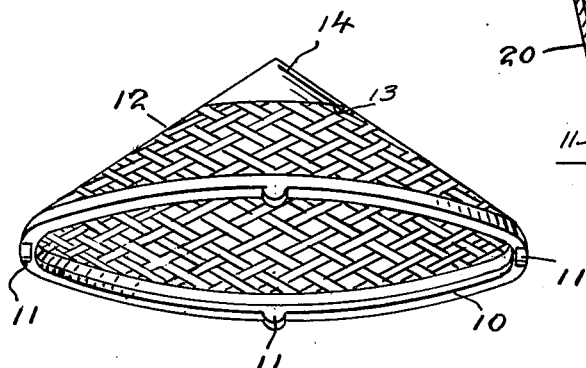
Figure 2 is a perspective view of the cone showing nodes on the lower surface of the rim thereof.

With the device positioned on the bottom 19 of a flowerpot 20, as illustrated in Fig. 3 an open area 21 is provided above the opening 22 in the bottom 19 and air is free to penetrate through the soil in the root area of the flowerpot whereby the roots are retained in a healthy condition.

As shown in Figure 3, the rim 10 is L-shaped in cross sections, and it will be understood that the rim may be of any suitable shape or made of any suitable material.

It will be understood that other modifications, within the scope of the appended claims, may be made in the design and arrangement of the parts without departing from the spirit of the invention.

What is claimed is:

1. A ventilating cone for use in the lower part of a flowerpot and adapted to be positioned over the opening in the bottom thereof comprising an annular rim having spacing nodes extended from the under surface, a wall having an intermediate portion of interlaced strips extended upwardly from the upper edge of the rim, and an imperforate cone extended from the upper edge of the wall to the apex of the device.

2. In a ventilator for use in a flowerpot, the combination which comprises an annular rim L-shaped in cross section and having nodes projecting from the under surface for spacing the under surface of the rim from the bottom of a flowerpot, and a conical-shaped wall extended from the upper edge of the rim to the apex and a portion of said wall including interlaced strips of material, and the remainder of the wall comprising an imperforate cone forming the apex of the ventilator.

(References on following page)

References Cited in the file of this patent

UNITED STATES PATENTS

| | | | |
|---|---|---|---|
| 117,766 | Gibson | Aug. 8, | 1871 |
| 195,580 | Crater | Sept. 25, | 1877 |
| 515,032 | Vestal | Feb. 20, | 1894 |
| 1,196,312 | Stuck | Aug. 29, | 1916 |
| 2,026,679 | Higgins | Jan. 7, | 1936 |
| 2,252,073 | Gray | Aug. 12, | 1941 |
| 2,637,143 | Reynolds | May 5, | 1953 |

FOREIGN PATENTS

| | | | |
|---|---|---|---|
| 27,744 | Great Britain | Dec. 2, | 1912 |
| 103,027 | Great Britain | Jan. 11, | 1917 |